INVENTOR
Charles Q. Reynolds

May 30, 1933.  C. Q. REYNOLDS  1,911,291
SURGICAL DRESSING AND METHOD OF MAKING SAME
Filed Feb. 6, 1930  3 Sheets-Sheet 2

INVENTOR
Charles Q. Reynolds

May 30, 1933.   C. Q. REYNOLDS   1,911,291
SURGICAL DRESSING AND METHOD OF MAKING SAME
Filed Feb. 6, 1930   3 Sheets-Sheet 3

INVENTOR
Charles Q. Reynolds

Patented May 30, 1933

1,911,291

UNITED STATES PATENT OFFICE

CHARLES Q. REYNOLDS, OF SWAMPSCOTT, MASSACHUSETTS

SURGICAL DRESSING AND METHOD OF MAKING SAME

Application filed February 6, 1930. Serial No. 426,281.

This invention relates to a surgical dressing, and method of making the same, and has for its object to provide a novel, useful and more convenient antiseptic bandage, and a novel method of making same whereby to facilitate the production of the herein described bandage, and other surgical dressings. Other objects will hereinafter appear from the description and drawings.

In surgical dressings as heretofore made and used, no bandage, to my knowledge, has been provided which may be readily, neatly and accurately transversely divided into any one of a number of precise and definite sizes without the use of cutting instrumentalities, such as scissors and the like. For example, it has been proposed heretofore, in the patent to Heineman, No. 802,190 of October 17, 1905, to provide a strip of bandage material with a separate coating of soluble antiseptic material the coating alone being applied or divided in sections so that a portion of the bandage as desired may be cut or torn from the bandage as stated in said patent, but such bandage has not the advantages of the bandage herein described.

My novel surgical bandage, as hereinafter more fully described, is provided with transverse slits dividing the same into individual though connected units, preferably, though not necessarily, of equal size, but at the same time being so held together on both sides by a sufficient width of adhesive tape so as to retain two or more units of bandage together when it is desired to apply at one time a plurality of the same. My novel bandage, therefore, provides a surgical dressing in a form in which the units may be readily separated from one another leaving no torn or rough edges and furthermore is so divided into units that the division may be neatly and readily made with certainty and in a definite and precise manner including any desired number of the units.

In the drawings:—

Figure 1:
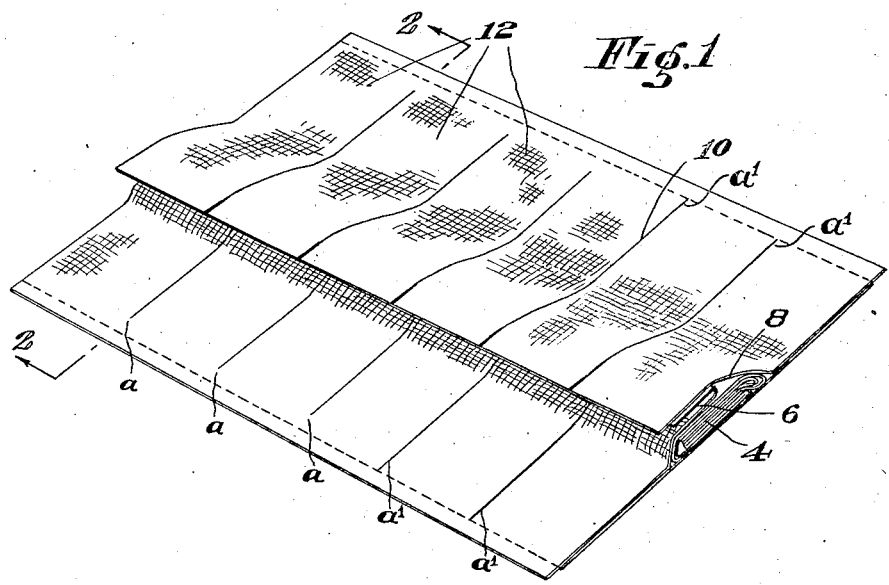
Fig. 1 is a perspective view of my bandage strip made in accordance with this invention and having individual units.
Figure 2:
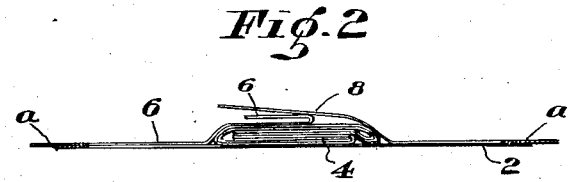
Fig. 2 is a cross section of the bandage shown in Fig. 1 taken on line 2—2 of the same.
Figure 3:
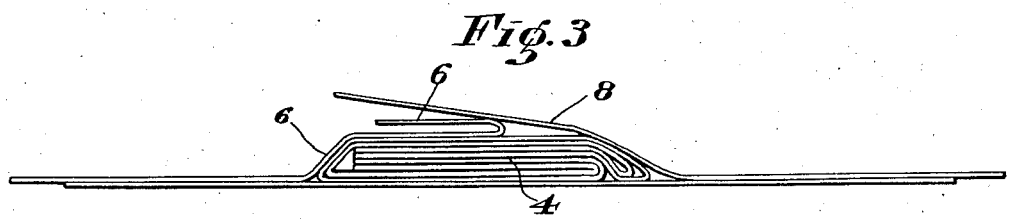
Fig. 3 is an enlarged end elevation of the bandage of Fig. 1 showing in detail the folding of the gauze or pad element and the stiffening and protective elements.

Referring to the drawings and particularly Figs. 1–3 inclusive, 2 indicates a strip of adhesive tape of a width suitable so as to give a bandage of the desired size, and attached thereto near the central portion of the same a folded antiseptic gauze pad 4, folded as hereinafter described. Overlying and protecting the pad 4 and marginal portions of the adhesive tape 2, are attached, by means of its exposed adhesive surfaces, stiffening and protecting strips 6 and 8 respectively. The adjacent edges of the strips being in overlapping relation for the purpose of providing a complete protective covering for the pad and adjacent portions of the adhesive strip 2 whereby the pad element 4 and exposed adhesive portions at each side thereof are covered and maintained in the desired condition until used. As may be seen from Fig. 1, the bandage there shown consists of a series of six units, (six being shown as it is a convenient unit though obviously any suitable number may be attached together in one piece), in which the transverse slits 10 are spaced at suitable intervals so as to provide units 12. The units are preferably held together by portions of both the protective material and of the adhesive tape indicated at a, a which are of a suitable narrow width, opposite the ends of the transverse slits 10, for example ¼″ or thereabouts, though the protective material alone may serve to attach the units together prior to application thereof, as indicated in Fig. 1 at a′. The portions a, a of the adhesive tape and overlying protective and stiffening material, such as crinoline, for example, are shown in cross section in Fig. 2, the balance of the bandage unit being shown in elevation inasmuch as the view is taken on line 2—2 of Fig. 1.

Figure 7:
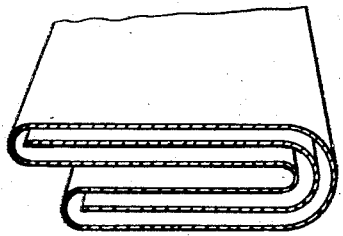
Fig. 7 is an enlarged perspective view taken on a cross section 7—7 thru the gauze folder.

The folding of the gauze or pad 4 is of importance and is done as herein shown, by inturning the raw edges of the same as best shown in Fig. 3. The pad 4 is preferably made of two strips of gauze each of which is folded into four or more layers. The exterior layers are carried over and the pad is folded upon itself along a line parallel to its length so as to overhang and adhere to the adhesive tape close by the adhering main portion of the exterior layer. Thus the pad adheres to the adhesive tape in parallel relation thereto and is held from unfolding and thus exposing either the inside or the raw edges of the gauze. The precise folding means employed for so folding the gauze are shown in Fig. 7 wherein each strip of gauze is folded into four layers, for example, the upper folds being wider so as to be in a position for attachment to the adhesive material separate from the attachment of the lower layers whereby all rough edges of the gauze are inturned and hence not exposed.

Figure 4:
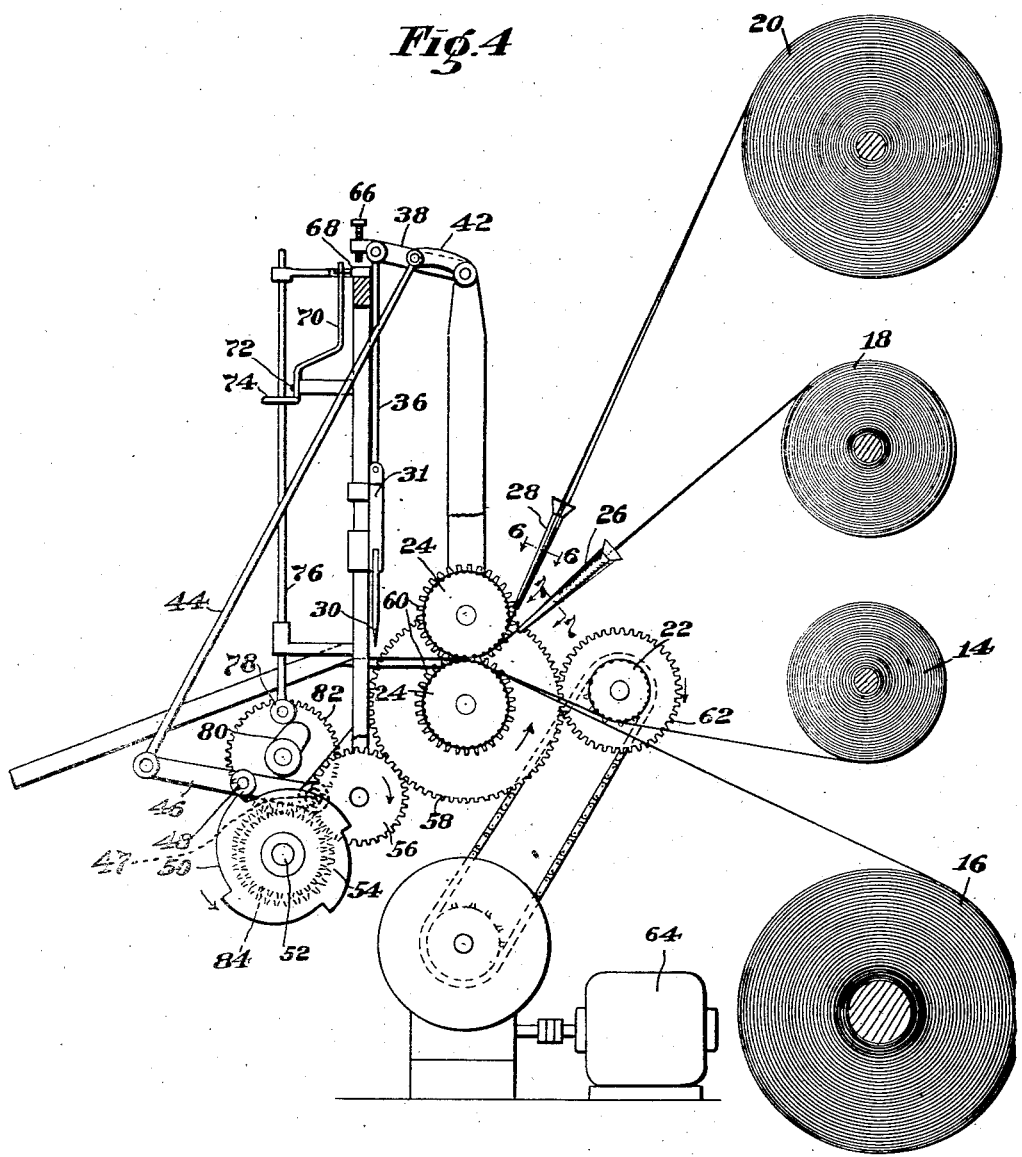
Fig. 4 is a side elevation of the machine, the frame and various other supporting parts of the same being omitted for purposes of clarity.
Figure 5:
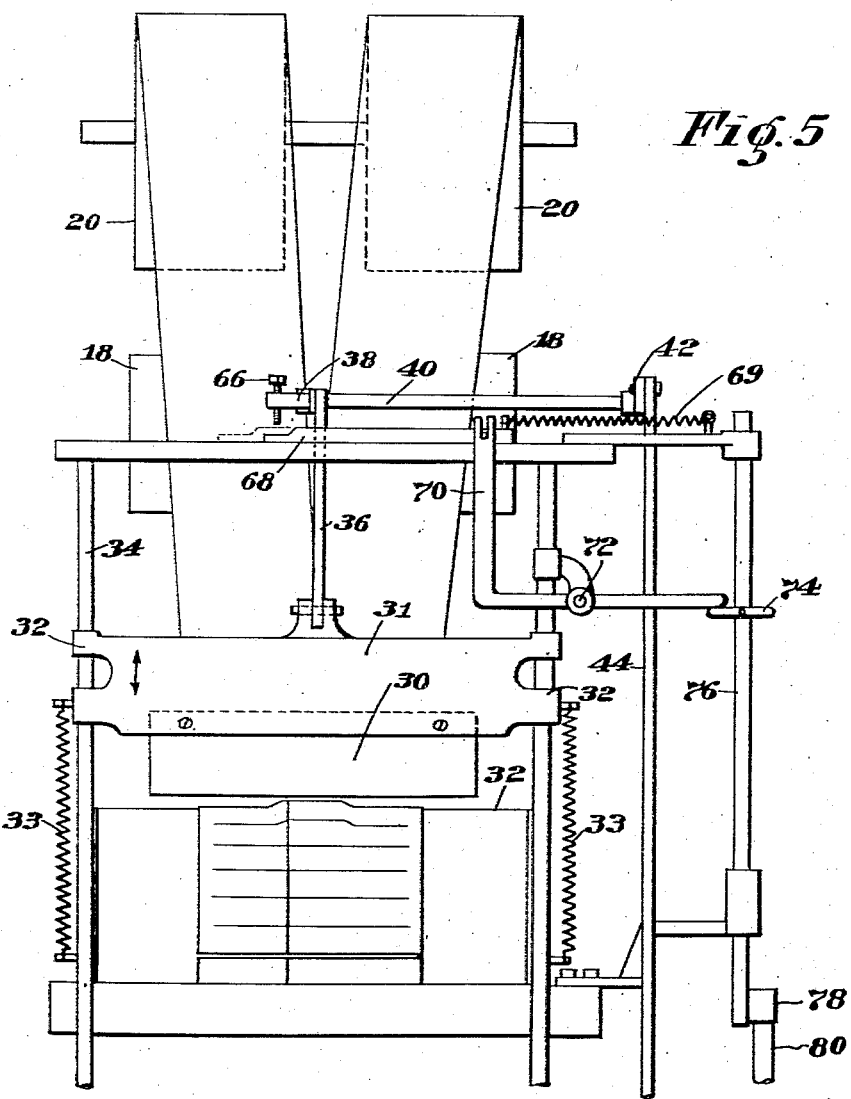
Fig. 5 is a front elevation of the machine showing the cutting knife and control therefor.
Figure 6:
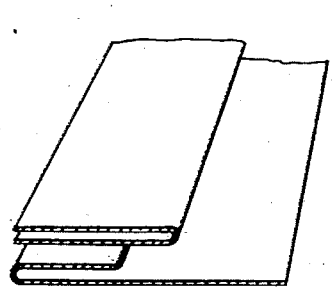
Fig. 6 is an enlarged perspective view taken on a cross section 6—6 thru the folder for the protecting and stiffening elements.

Referring to Figs. 4 and 5 wherein the principal parts of an apparatus suitable for making the product in accordance with the method herein described are shown, a roll of adhesive tape is indicated at 14 the tape being for example three to four inches wide. Beneath such roll is held a roll of paper indicated at 16 and overlying the roll of adhesive tape 16 are placed side by side two rolls 18 of gauze of a suitable width, e. g., three to four inches. Above such rolls are held two rolls 20 of suitable covering and stiffening material, such as crinoline. All of these rolls are rotatably held in the machine by means (not shown) so as to be freely rotated when the ends of the materials on the respective rolls are led to the rolls which pull the same thru the machine. The paper of the roll 16 is preferably of a width about ½″ less than the width of the finished bandage and is led underneath a knurled roll 22, the adhesive tape being therebetween with its adhesive surface adjacent the knurled surface of the roll 22. The paper from the roll 16 together with the adhesive plaster overlying and overhanging said paper are led from the roll 22 between upper and lower tractor rolls 24 which are suitably driven, by means presently to be described, so that their peripheral or surface speed is the same as that of the knurled roll 22. There is also passed from the rolls 18, between the tractor rolls and above the adhesive tape, two folded strips of gauze which are first led thru folding means 26 which folds and arranges the strips of gauze into the form of the pad 4 which becomes adhesively attached to the upper surface of the adhesive plaster by reason of the thickness of the same together with the pressure of the upper presser and tractor roll 24 which roll however is prevented from contact with either the pad 4 or the adhesive plaster by reason of the overlying covering of stiffening material from the rolls 20. This stiffening material is led thru two leads to the guiding and folding means 28 which folds the same as shown in Figures 1, 2 and 3, the folding means being shown in detail in Fig. 6.

The complete and continuous bandage strip is therefore formed continuously and passes from the presser and tractor rolls 24 under the knife 30 and over an anvil 32, the assembled strip bandage or surgical dressing being stiff enough as to be readily pushed from between the rolls 24 and across the anvil. The knife 30 has sharpened edge of steel, for example, which contacts directly with and severs the bandage by reason of its contact therewith as will be presently described. The knife 30 is suitably held for vertical reciprocation by means of its bearing sleeves 32 which are slidable on the vertical rods 34, the knife with its knife holder 31 being reciprocated thru the springs 33 and link 36, crank 38, rock shaft 40, crank 42 and push rod 44, the lower end of which push rod is pivoted to a lever 46 having its opposite end working about a fixed pivot 47 and having a follower 48 which follower is actuated by a lobed cam 50. The rotation of this cam controls the rise and fall of the follower 48, and hence the knife 30, thru the chain of mechanism just described. The lobed cam 50 is affixed to and driven by a shaft 52 which is in turn driven by a gear 54 thereon, the gear 54 being driven thru the intermediate gear 56 from the gear 58 which is affixed to the shaft of the lower of the two presser rolls 24 so as to provide a drive for such presser rolls, there being provided gears 60 thru which the upper presser roll is driven. The gear 58 is driven by means of a gear 62 attached to the shaft carrying the knurled roll 22 which shaft is driven for example through a silent chain and worm reduction gear from a small electric motor as indicated at 64, or other suitable source of power. The stroke of the knife and the extent to which it is permitted to approach the anvil 32 is controlled by means of an adjusting screw 66 which passes thru the crank 38 and normally contacts with the stepped end of a transverse slide rod 68 arranged at the top of the frame of the machine. For purposes of clarity the size of step is exaggerated in the drawings but ordinarily need be only a matter of a few thousandths of an inch, for example, .010 to .015. In the cutting off operation of the machine, as when severing one series of units of one of my novel bandages, as herein described, from the strip of bandages, the knife 30 is permitted to very closely approach the anvil 32 so that the knife passes downwardly thru the entire bandage and enters to a considerable extent the narrower layer of paper underlying the bandage, but, when the intermediate cuts are made which do not completely sever the assembled bandage strip, the knife is withheld from such a close approach to the anvil 32 by means of the slide rod 68 which is urged to the left, as shown in dotted lines in Fig. 5, so that the thicker portion of the rod prevents the screw 66 and hence the knife 30 from coming so far downwardly. As shown in solid lines in Fig. 5, the rod 68 and adjusting screw 66 are in position for a complete cutoff of the assembled bandage strip, but, as just mentioned, when the rod 68 is urged toward the left, as indicated in dotted lines, the crank 38 is so held that the knife does not so closely approach the anvil. This movement of the rod 68 is controlled by means of the bell crank 70 which is pivotally attached to the other end of the slide rod 68, which bell crank 70 is pivotally mounted at 72. A spring 69 tends to hold the slide rod 68 toward the right, but is normally opposed in its action by means of a member 74 fixed upon the push rod 76 which rod is capable of vertical movement in suitable guides as shown. The rod 76, through a roller follower 78 attached to the lower end of the rod 76, is actuated by means of the cam 80 which is affixed to and rotated by a gear wheel 82 which is driven from the gear 84 attached to the shaft 52. Thus there is provided a means for timing and controlling the intermediate cuts in the surgical dressing as herein shown and described, and the number of units thereof that are to be included in any one bandage. The number of units in any one bandage may be changed by means of substituting a different cam and/or gears 80, 82 and 84, and the width of the individual units of a given bandage may be changed by substituting a different cam 50 on the shaft 52 or changing the drive ratio of shaft 52 by means of substituting a different size gear 54, the gear 56 being simply an intermediate gear mounted so as to be held in any suitable vertical position as required.

It is believed that from the above description the method and mode of operation will be clear without further description of the operation of the machine. It is pointed out, however, that in the machine as shown, the narrower paper is provided so as to insure but a partial severance between the units of a given bandage in which case the knife is checked in its descent by reason of contact of adjusting screw 66 with the thicker portion of the rod 68 when thereunder, the edges of adhesive material will overhang the edges of paper so that the adhesive material is merely pressed downwardly into the space opposite the edge of the paper instead of being cut off. It will be appreciated that a divided anvil having vertical reciprocating end portions might be provided so as to achieve the same result as a knife which is checked in its descent as herein described, and it is contemplated that such equivalent means shall be covered by the claims appended hereto.

Having described my invention, what I wish to secure by Letters Patent is:—

1. As a new article of manufacture, a surgical dressing comprising a base of adhesive tape having transversely thereof one or more slits so as to divide the same into units, and having adjacent the opposite ends of said transverse slits, unsevered portions of overlying stiffening and protective material extending beyond the adhesive tape and attaching the units together, each of the transverse units having attached thereto and approximately centrally thereof, an antiseptic gauze pad, said pad comprising solely, folded layers of gauze folded upon themselves to bring the edges of the gauze within an outer layer, and with the layers overhanging so as to adhere to the adhesive tape in adjacent but separated positions, said protective material being adapted to maintain sterility of said pad and to maintain a tackiness of the exposed adhesive material adjacent thereto, and comprising complementary protective strips overlying the exposed adhesive portions of said tape and having the adjacent ends of said strips overlapping whereby to cover and protect said gauze pad and said adhesive material.

2. As a new article of manufacture, a surgical dressing comprising a strip of adhesive tape having transversely thereof one or more slits extending but partially thereacross, so as to divide the same into units, but having adjacent the opposite ends of said transverse slits, unsevered portions of said tape attaching the units thereof together, each of the transverse strips having attached thereto and approximately centrally thereof, an antiseptic gauze pad, said pad comprising folded layers of gauze folded upon themselves to bring the edges of the gauze within the outer layer, and so as to overhang and adhere to the adhesive tape in adjacent but separated positions, and means to maintain sterility of said pad and to maintain a tackiness of the exposed adhesive material adjacent thereto, comprising complementary protective strips, partially severed transversely to provide slits coincident with the slits in the tape overlying the exposed adhesive portions of said tape and having their adjacent ends overlapping whereby to cover and protect said gauze pad and said adhesive material, said protective strips having continuous marginal portions extending beyond the edges of said tape.

3. The method of making multi-unit surgical dressings which consists in continuously assembling upon a moving strip of paper, adhesive tape having its adhesive surface uppermost, a longitudinally folded gauze pad and transversely overlapping strips of stiffening and protective material held by the adhesive portions of said tape at either side of said gauze pad, partially severing said assembly transversely by one or more slits passing entirely through the same but terminating short of the edges thereof, and then completely severing said strip into sections each of which includes a series of said bandage units.

4. The method of making multi-unit surgical dressing which consists in continuously assembling upon a moving strip of paper, a moving strip of adhesive tape, a gauze pad on the adhesive surface thereof and overlapping strips of stiffening and protective material held by the adhesive portions of said tape at either side of said gauze pad, partially severing said assembly transversely by one or more slits passing entirely through the same but terminating short of the edges of said tape and then completely severing said strip into sections each of which includes a series of said bandage units.

5. The method of making a multi-unit surgical dressing as claimed in claim 4 in which said pad is continuously folded and applied to said tape so as to adhere to the same in adjacent but separated positions.

6. As a new article of manufacture, a surgical dressing comprising a base of adhesive tape having transversely thereof one or more slits dividing said tape throughout its width into units and having adjacent the opposite ends of said transverse slits unsevered portions of overlying, stiffening and protective material extending beyond the adhesive tape and attaching the units together, said units being held in juxtaposition solely by said protective stiffening material, each of the transverse units having attached thereto and approximately centrally thereof an antiseptic gauze pad, said protective material being adapted to maintain sterility of the pad and to maintain a tackiness of the exposed adhesive material adjacent thereto, and comprising complementary protective strips overlying the exposed adhesive portions of said tape and having the adjacent ends of said strips overlapping whereby to cover and protect said gauze pad and said adhesive material.

CHARLES Q. REYNOLDS.